(12) United States Patent
Potrebic et al.

(10) Patent No.: US 6,804,824 B1
(45) Date of Patent: Oct. 12, 2004

(54) SYSTEMS AND METHODS USING MULTIPLE TUNERS

(75) Inventors: Peter Potrebic, Calistoga, CA (US); Jeffrey D. Yaksick, Sunnyvale, CA (US); Geoffrey R. Smith, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 589 days.

(21) Appl. No.: 09/607,045

(22) Filed: Jun. 30, 2000

(51) Int. Cl.[7] ............................. G06F 3/00; G06F 13/00; H04N 5/945
(52) U.S. Cl. .......................................... 725/38; 348/732
(58) Field of Search ............................... 348/720, 731, 348/732, 569; 725/27, 41, 38

(56) References Cited

U.S. PATENT DOCUMENTS

| | | | | |
|---|---|---|---|---|
| 5,900,868 A | * | 5/1999 | Duhault et al. | 725/27 |
| 5,933,192 A | * | 8/1999 | Crosby et al. | 348/731 |
| 6,020,930 A | * | 2/2000 | Legrand | 725/41 |
| 6,118,498 A | * | 9/2000 | Reitmeier | 348/732 |
| 6,125,259 A | * | 9/2000 | Perlman | 725/28 |
| 6,147,714 A | * | 11/2000 | Terasawa et al. | 348/564 |
| 6,188,448 B1 | * | 2/2001 | Pauley et al. | 348/731 |
| 6,295,646 B1 | * | 9/2001 | Goldschmidt Iki et al. | 725/41 |
| 6,334,217 B1 | * | 12/2001 | Kim | 725/38 |
| 6,456,334 B1 | * | 9/2002 | Duhault | 348/565 |
| 6,519,011 B1 | * | 2/2003 | Shendar | 348/731 |
| 6,732,371 B1 | * | 5/2004 | Lee et al. | 725/41 |

* cited by examiner

*Primary Examiner*—John Miller
*Assistant Examiner*—Scott Beliveau
(74) *Attorney, Agent, or Firm*—Workman Nydegger

(57) ABSTRACT

The present invention enhances a user experience by using multiple tuners to simultaneously tune multiple channels. The multiple tuners channels included in programming content, so that a user is able to rapidly tune the channels without having to wait. Other features include the ability to simultaneously record conflicting programs. Each tuner can tune to a separate channel and either display and/or record that channel. The multiple tuners also allow a snapshot of recent channels to be maintained and updated such that a user can be apprised of the current content of those channels without having to separately tune each channel.

19 Claims, 4 Drawing Sheets

SYSTEMS AND METHODS USING MULTIPLE TUNERS

BACKGROUND OF THE INVENTION

1. The Field of the Invention

The present invention relates to systems and methods for tuning programming content. More particularly, the present invention relates to systems and methods for tuning one or more channels included in the programming content received from programming providers.

2. The Prior State of the Art

Currently, people are able to receive programming content from a wide variety of sources including local television stations, satellite systems, cable systems, and the Internet. While programming content from providers such as local television stations is usually freely available to most people, people are often required to pay a fee to the provider of the programming content from other sources. Further, the programming content that is freely available from local television stations is usually in an analog form, while the programming content received through cable systems, satellite systems, and the Internet is often digital in nature.

While digital programming content is desirable for both the provider and the recipient of the programming content, there are problems associated with digital programming content that are not typically present or associated with analog programming content. Digital programming content, for example, is typically transmitted by dividing the programming into separate identifiable packets which are multiplexed with other packets in the digital transmission that correspond to other programming. All of the packets, which include video and audio packets, are sent in the transmission and when the packets arrive at an intended recipient, they have to be demultiplexed and processed.

Another aspect of digital programming content is that the number of channels that are included in the programming content is often dependent on the digital quality of those channels. Thus, if a digital transmission contains high quality video and audio packets, there is an associated bandwidth cost that must be paid in order to transmit those packets. In other words, high quality digital content translates to fewer channels being transmitted in the programming content.

Because digital programming content is packetized and multiplexed, a set top box that receives the programming content from the provider needs significant memory and processing power to properly process and display the digital programming content. For example, when digital programming content is received from a provider, the programming content is tuned and demodulated in order to select a particular channel included in the programming content. After the channel has been tuned and demodulated, the relevant video and audio packets are separated and processed by the set top box. The separated video and audio packets are decoded and, if necessary, decrypted such that the set top box produces video and audio signals that may be interpreted by a user device such as a television.

Producing video and audio outputs from digital programming content can therefore require significant system resources and time. As a result, a user is often required to wait from a fraction of a second to several seconds before a particular channel may be properly tuned and displayed by the set top box. This time delay is especially evident when a user is channel surfing, or rapidly cycling through the channels included in the programming content. In this instance, a user is prevented from quickly changing channels because each channel selected by the user must first be tuned and processed before each channel is displayed to the user. The user is therefore unable to quickly scan through the channels included in the digital programming content.

The time required to properly tune digital programming content can therefore have a negative impact on the user experience. Systems and methods that can reduce or eliminate the wait experience by a user as well as enhance the user experience would be an advance in the art and are desired.

SUMMARY OF THE INVENTION

The present invention relates to systems and methods for tuning one or more channels included in digital programming content. One aspect of the present invention is to provide a second digital tuner in a set top box that enables an additional channel included in the programming content to be simultaneously tuned and processed with another channel included in the programming content.

When a user decides to change channels, the user must often wait until the channel is tuned before it is displayed to the user. One feature provided by an additional tuner is the ability to tune a channel that the user is not currently viewing. If the channel tuned by the additional tuner is selected by the user when the user changes channels, then the wait the user would otherwise experience while waiting for the selected channel to tune is reduced or eliminated. Thus, the present invention enhances the user experience by predicting which channel the user will select in the future and; by tuning that channel before it is selected by the user.

This is particularly useful when a user is sequentially cycling through the channels included in the programming content in either an incremental or decremental fashion. As a user sequentially cycles through the available channels, the tuners are used in an alternating fashion such that the user may rapidly cycle through the channels without having to wait for each channel to be tuned. More specifically, while one tuner is occupied with a channel being viewed by the user, the other tuner is used to tune the next sequential channel before that channel is selected by the user. Thus, when the next channel is selected, the user does not have to wait for that channel to tune because it has already been tuned by the extra tuner. In addition, the set top box may be configured to cause the tuners to skip channels such as pay-per-view channels or scrambled channels that cannot be tuned. As a result, a user who is sequentially cycling through the available channels is presented with only those channels that can be tuned and displayed.

Another feature provided by the present invention is the ability to cache channels or maintain a snapshot of recently viewed channels. By keeping track of specified channels or of channels that have been recently viewed by the user, a preview or snapshot of those channels can be continually updated by one of the tuners while another channel tuned by the other tuner is being viewed or recorded by the user. When the user views the recent channels or the channel cache, the user is able to quickly review the current content of several different channels simultaneously without having to select and tune each of those channels individually.

Another advantage of the present invention is the ability to view one program while recording another program. While one tuner is tuning the channel that is being viewed, the other tuner is tuning the channel that is being recorded. Alternatively, the additional tuner allows more than one channel to be recorded simultaneously while still permitting a user to view a pre-recorded channel.

Another feature of the additional tuner is the ability to update data that is associated with a particular channel. For example, some programs or channels display information that is retrieved from a separate source such as the Internet. In accordance with the present invention, the second tuner may be used to retrieve the updateable data from the Internet or from the programming content provider in the background while a user views the channel associated with the updateable data.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 is a block diagram illustrating cached channels that are updated using one of the multiple tuners of the set top box;

DETAILED DESCRIPTION OF THE INVENTION

The present invention relates to the programming content received by a set top box. The programming content is often digital in nature and includes multiple channels which may be tuned and viewed by a user, and the present invention provides systems and methods for simultaneously tuning multiple channels. By tuning more than one channel, the additional tuned channels may be used to enhance the user experience. For example, the set top box may track those channels that have been recently viewed by the user in a channel cache. By viewing the contents of the channel cache, a user may quickly ascertain the current content of more than one channel. In addition, the user is able to record one or more channels while viewing a separate channel. The user is also able to update, in the background, the interactive data that is associated with certain channels.

The present invention extends to both methods and systems for tuning multiple channels. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. One example of a special purpose computer is a set top box. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain fiction or group of functions.

Figure 1:
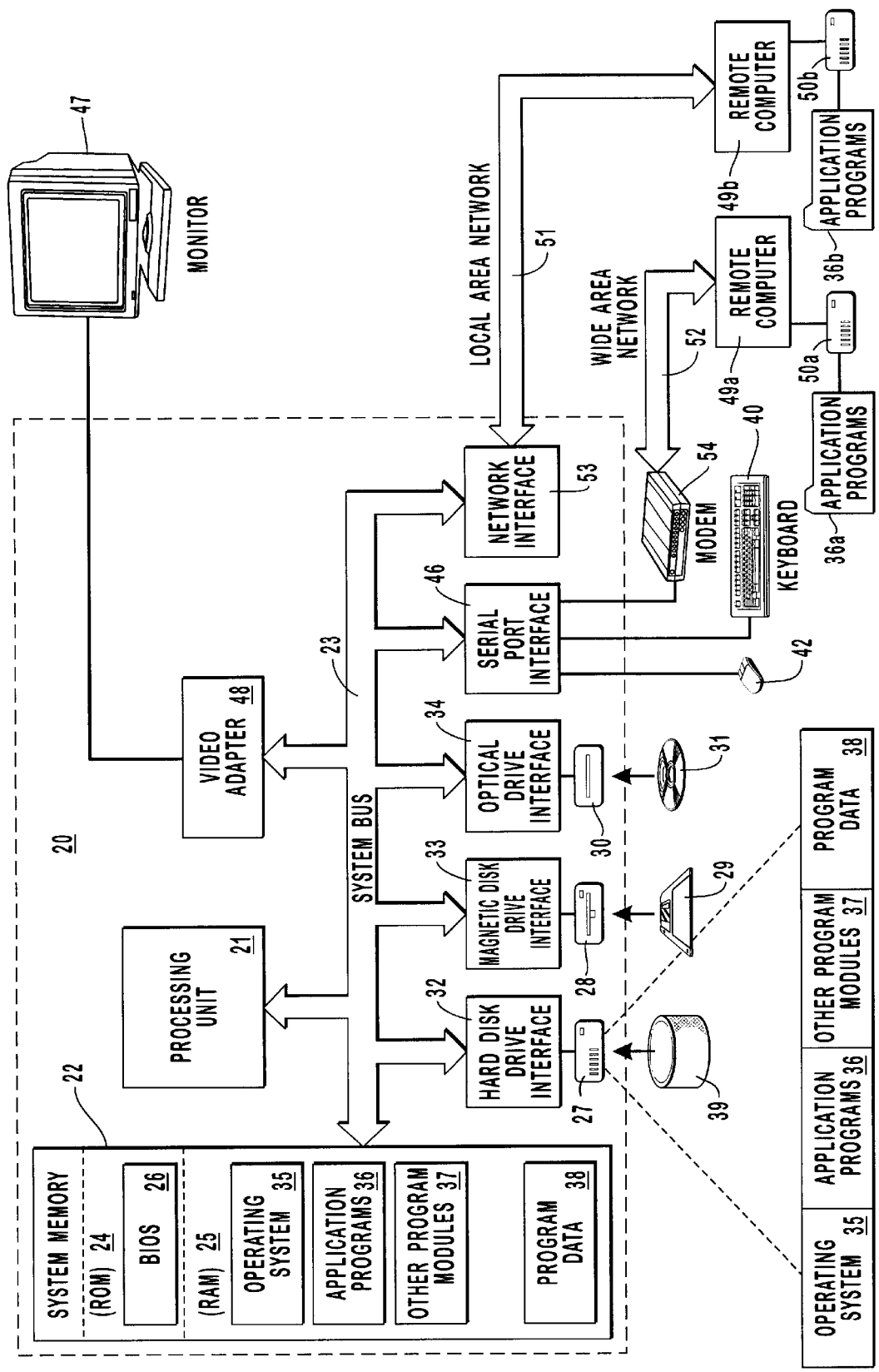
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. ;The particular sequence of such executable instructions or associated data structures represent examples of corresponding acts for implementing the functions described in such steps.

Those skilled in the art will appreciate that the invention may be practiced in network computing environments with many types of computer system configurations, including set top boxes, personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk (drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, BERNOULLI cartridges, RAMS, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
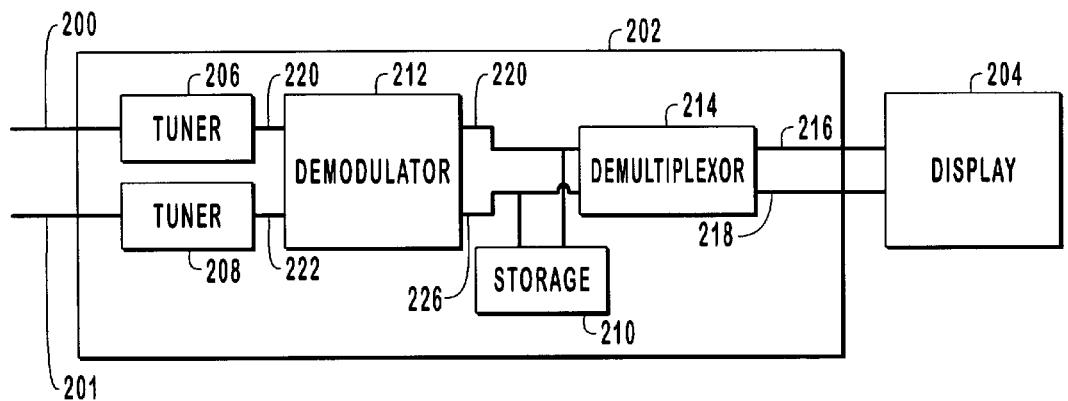
FIG. 2 illustrates an exemplary set top box that includes multiple tuners and a storage medium.

FIG. 2 is a block diagram illustrating an exemplary set top box, which represents one example of a special purpose computer that can implement the invention. The set top box 202, which receives programming content 200 and 201 from a content provider, is representative of analog and digital devices including, but not limited to, satellite receivers, digital recording devices, cable boxes, video game consoles and the like or any combination thereof, all of which are examples of special purpose computers. Television sets integrated with set top boxes are also embraced by the set top box 202. The set top box 202 typically includes portions of the general purpose computer as described with reference to FIG. 1. Additionally, the set top box 202 can be, but does not need to be, capable of connecting with a network such as the Internet. transmissions, Internet data or transmissions, Motion Pictures Experts Group (MPEG) video, video streams, audio streams, and the like or any combination thereof whether analog or digital in nature. Programming content 200 also includes the content carried by satellite transmissions, cable transmissions, radio transmissions, local television transmissions and the like or any combination thereof. For example, the specific programs on a channel are considered to be programming content. Internet data, web pages, web sites and the like, or data that complies with Internet protocols is also included in the programming content. As illustrated in FIG. 2, the programming content 200 received at the tuner 206 is often different from the programming content 201 received at the tuner 208. Thus, the tuner 206 may be receiving one channel of a satellite transmission while the tuner 208 is receiving a different channel of the satellite transmission. However, it is understood that any reference to the programming content 200 can apply also to the programming content 201.

Included in the programming content 200 is electronic program guide (EPG) data, also referred to herein as guide data. The guide data is usually a description of the programming content 200 and may include, but is not limited to, program titles, program starting times, program ending times, program ratings, program descriptions, program content ratings, program duration, program reviews, and the like or any combination thereof. More generally, the guide data, as used herein, refers to data or information that is related to or describes the programming content 200. The guide data is usually processed by the set top box 202 and displayed to a user via the display 204, which may be a television set, a computer monitor, or other display device.

Often, the programming content 200 often contains multiple channels, each of which may carry a different kind of data. For instance, one channel may carry MPEG video streams while another channel may carry Internet related data. The set top box 202 typically has several components that act on the programming content 200 in order to produce or display a channel on the display 204 or otherwise render the content of the programming content 200.

When the programming content 200 or 201, such as a satellite transmission, is received at the set top box 202, the programming content 200 or 201 is first tuned to a particular channel 220 of 222. After the programming content 200 or 201 is tuned to the channel 220 or 222, the channel 220 or 222 is demodulated by a demodulator 212. Next, the channel 220 or 226 is demultiplexed by a demultiplexor 214 to separate the relevant packets 216 or 218 of the channel 220 or 226. Finally, the separated packets 216 or 218 are processed and displayed on display 204. In this manner, a user is able to view or otherwise interact with the channel 220 or 222.

The set top box 202 illustrated in FIG. 2 includes digital tuners 206 and 208 and each tuner 206 and 208 is capable of tuning a channel included in the programming content 200. The ability of the tuners 206 and 208 to tune more than one channel in the programming content 200 is important for many aspects of the present invention. Importantly, the ability to tune more than one channel allows another channel to be tuned before user input is received selecting that channel. When the user selects the channel that has already been tuned, the channel may be immediately displayed to the user without latency and the delay that would otherwise be experienced by the user is reduced or eliminated.

For example, a user may experience a delay of a fraction of a second to several seconds when selecting another of the channels in the programming content 200. With the tuners 206 and 208, the next channel to be tuned can be predicted and tuned before the next channel is actually selected by the user. Thus, the delay experienced by the user is eliminated because the next channel is already tuned.

Tuning a predicted channel before a user selects the predicted channel is particularly useful when a user is cycling through the channels of the programming content 200 in either an incremental or decremental fashion. More specifically, when a user is incrementally cycling through the channels and is currently viewing a channel tuned by the tuner 206, the tuner 208 is tuning the next channel. When the user selects the channel already tuned by the tuner 208, the tuner 206 is used to tune the subsequent channel. The tuners 206 and 208 alternate to tune the next channel to be selected and viewed or previewed by the user.

Alternately using the tuners 206 and 208 to tune the subsequent channel is an example of predicting the next channel to be selected by the user. However, the set top box 202 is capable to tuning more efficiently because some of the channels included in the programming content 200 may be tuned, but the content may not be displayed. This occurs, for example, on channels that the user is not authorized to view. Those channels are either blank or scrambled such that a user may not view that channel. Preferably, these channels are skipped by the tuners 206 and 208 when a user is sequentially cycling through the channels included in the programming content 200.

The set top box 202 also includes a storage 210, which is computer memory or data storage device such as a hard drive magnetic disk or other suitable medium. The storage 210 enables a user to utilize the additional tuner in the set top box to record one channel while viewing another channel. More specifically, a user may view a channel tuned by the tuner 206 on the display 204, while a different channel, tuned by the tuner 208, is stored on the storage 210 to be viewed later. The data stored on the storage 210 is usually received from the demodulator 220 in a multiplexed form although the data can be stored from the output of the tuner or from the output of the demultiplexor. When the data contained in the storage 210 is later viewed, it must be demultiplexed.

Figure 3A:
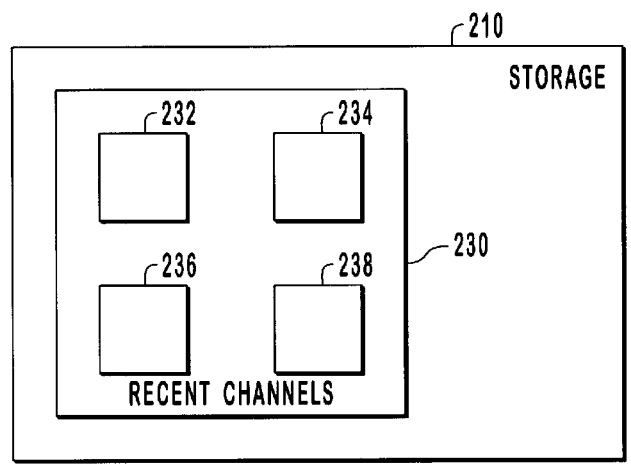
FIG. 3A is a block diagram illustrating cached channels that are updated using one of the multiple tuners of the set top box.
Figure 3B:
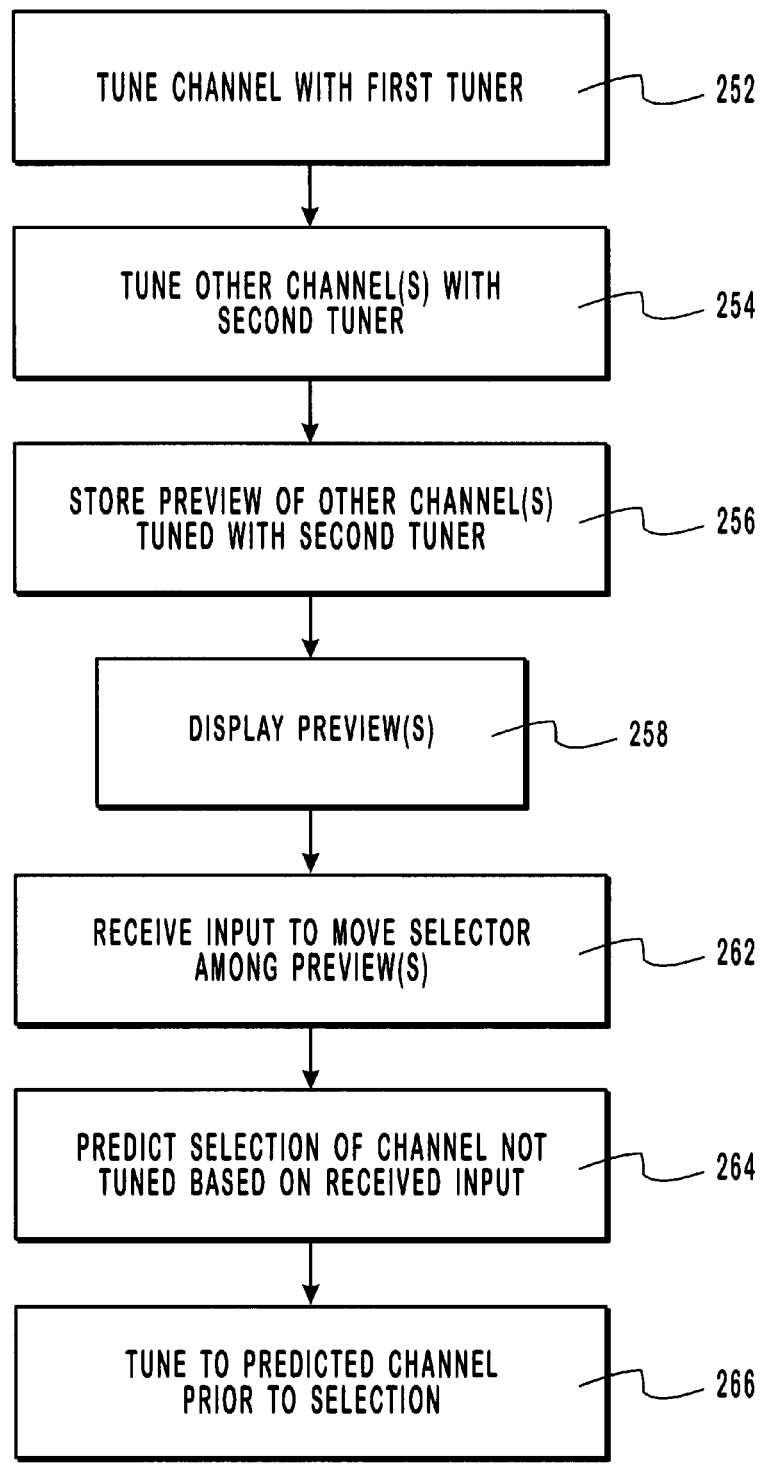
FIG. 3B is an example flowchart for previewing and selecting cached channels.

FIG. 3A is a block diagram that illustrates recent channels 230, and FIG. 3B is an example flowchart for previewing and selecting from recent channels 230 that will be described in connection with FIG. 3A. In this example, the recent channels 230 includes frame 232, frame 234, frame 236, and frame 238. The recent channels 230 are stored on the storage 210 and are accessible by a user. Each of the frames 232, 234, 236, and 238 is updated by, for example, the tuner 208, while the other tuner may be used to view a channel. In other words, while one tuner 206 is used to tune (252) a channel for viewing, the other tuner 208 tunes (254) to other channels, such as recent channels 230, for updating the frames 232, 234, 236, and 238 of recent channels 230. Because each frame is regularly updated by one of the tuners 206 and 207, the recent channels 230 reflect the current status or content of several channels. The frames 232, 234, 236, and 238 may be simultaneously displayed on the display 204 such that a user is aware of the current content of the channels represented by those frames. A user may subsequently choose to view one of those channels.

More specifically, the recent channels 230 is used to store (256) an image or frame of one or more channels that the user has either viewed recently or may potentially view in the near future. Because the recent channels 230 are essentially snapshots or previews of the programming content of the channels represented by the frames 232, 234, 236, and 238, the second tuner may be used to regularly update those snapshots or images. One advantage of regularly updating the recent channels 230 is that when a user chooses to view the recent channels 230, the user is provided with the current content of the represented channels. Using the second tuner to regularly update the recent channels 230 also ensures that if a user chooses to view one of the channels maintained in the recent channels 230, then the user will be able to view the content represented by the snapshot. Failing to regularly update the recent channels 230 results in frames that do not accurately represent the current programming content of the associated channels. The number of channels stored in the recent channels 230 can either be preset, or can vary dynamically according to user activity.

When a user views the recent channels (i.e. when displaying (258) the snapshots or previews of the recent channels), one of the snapshots displayed in the recent channels is typically selected and one of the tuners can be used to display the channel associated with the snapshot while maintaining the other snapshots as previously described. The user is thus able to view one of the recent channels while updating the other recent channels. The second tuner in combination with user input can be used in predicting which channel will be selected for viewing by the user.

For example, the snapshots included in the recent channels may be arranged in columns and rows on the display device. When a user uses an input device such as a remote control to select one of the snapshots, a command to move a selector in some direction is usually received (262) at the set top box. This indication provided by the user can be used to predict (264) that the user intends to select one of the channels in the current row or column and the second channel can be used to tune (266) one of those channels in advance such that the delay associated with tuning a digital channel is eliminated and the user experience is enhanced. Thus, predicting a channel is related to a direction indicated by the user input, where the direction may correspond, for example, to movement of a display selector along a column or row of the snapshots displayed in the recent channels. The movement of the display selector is controlled by user input.

Alternatively, all of the channels in one of the rows or columns can be viewed as sequential channels and when a user indicates a movement in the direction of a row or a column, the tuners can be used to alternately tune the channels represented by the row or column of snapshots. More generally, as the user navigates the recent channels using, for example, a remote control to move a display selector from snapshot to snapshot, this user input can be used to predict which channel the user intends to select and the multiple tuners can be used to pre-tune those channels. This is another example of predicting a channel to be tuned and displayed to a user.

Figure 4:
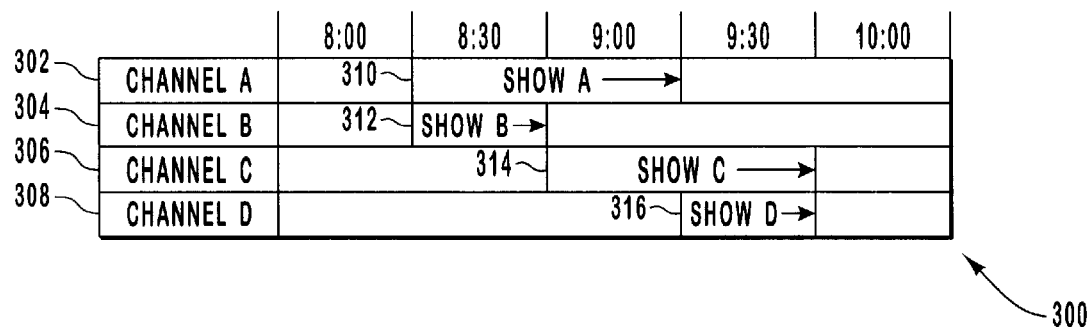
FIG. 4 illustrates guide data that is received as part of the programming content.

FIG. 4 is a representation of the guide data 300 that may be included in the programming content 200. The guide data 300 is often displayed on the display such that a user can quickly determine the programs that are showing or will be showing on various channels. Because the number of channels contained in the programming content is typically large, only a few of the channels will be displayed at a time, but a user may easily view the guide data for the other channels included in the programming content through the use of a scroll bar or other method.

FIG. 4 further illustrates show A 310, show B 312, show C 314, and show D 316. As illustrated, the time slot of show A 310 overlaps with the time slots of show B 312 and show C 314, the time slot of show B 312 overlaps with the time slot of show A 310, the time slot of show C 314 overlaps with the time slots of show A 310 and show D 316, and the time slot of show D 316 overlaps with only the time slot of show C 314.

Using only the tuner 206, a user must decide which of the shows are to be recorded. A user could select to record show A 310 and show D 316, or show B 312 and show C 314, or show B 312 and show D 316. The user cannot, however, record the shows whose time slots overlap.

The additional tuner 208 enables a user to eliminate the conflict that exists with a single tuner and record each of the shows illustrated in the guide data 300. For example, a first tuner could be used to record show A 310 and show D 316, while a second tuner is used to record show B 312 and show C 314. Alternatively, a user may use the first tuner to view and/or record show A 310 and show D 316 while the second tuner is used to record show B 312 and show C 314. If the tuners are used to record the shows or programs, then the programs are stored on the storage medium illustrated in FIG. 2. In this manner, potential recording conflicts may be avoided when two programs or shows have a conflicting time slot. By extending the number of tuners, additional shows can be recorded without a conflict.

Figure 5:
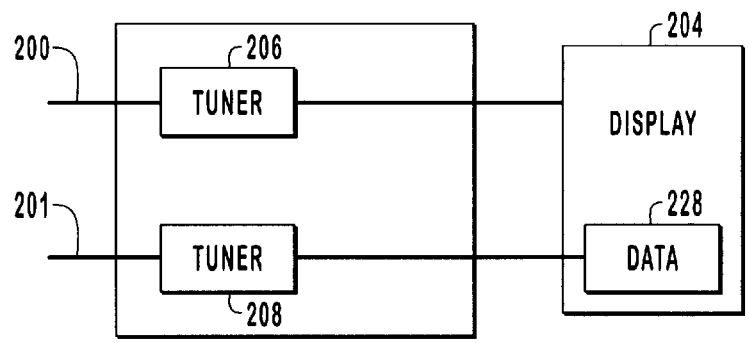
FIG. 5 is a block diagram illustrating the use of an additional tuner to update an interactive display.

FIG. 5 is a block diagram illustrating the use of an additional tuner to update interactive data that is associated with one or more channels of the programming content. In FIG. 5, the channel 220 tuned by the tuner 206 is displayed on the display 204. The channel 220 has interactive data 228 associated with the channel 220. In this example, the tuner 206 may be used to tune the channel 220 while the tuner 208 is used to update the data 228 that is associated with the channel 220. Otherwise, the viewing of the channel 220 may have to be interrupted while the data 228 is updated. The data required to update the data 228 is received from the programming content 201.

For example, the guide data is often available from the Internet and in order to provide current guide data to a user, the guide data must be regularly updated. In a single tuner environment, the data 228, which is the guide data in this example, is retrieved from the Internet at a time when the user is not likely to be viewing a:channel and stored on the set top box. The presence of an additional tuner allows the guide data to be updated at any time without interrupting the user. The additional tuner is able to access and retrieve the guide data in the background while another channel is tuned and viewed by the user using the other tuner. Advantageously, the data can be updated in shorter intervals, which provides the user with current data. In this manner, the data 228 may be updated and provided to a user without interrupting a user that is currently viewing a separate channel.

Another type of data 228 that may be retrieved by the second tuner is related to interactive channels. For example, the channel 220 being displayed to a user may be a news channel and the data 228 may be weather forecasts, stock quotes, sport scores and the like. The data 228 in this instance is updated often and rather than require the tuner 206 to pause while the data 228 is retrieved from the programming content 200, the tuner 208 may be used to continually update the data 228 through the programming content 201. Thus, the ability to, tune multiple channels included in the programming content significantly enhances the user experience. While the present invention has been described in terms of two tuners, the systems and methods of the present invention may be extended to any number of multiple tuners.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a set top box receiving programming content, the programming content having a plurality of channels, a method of allowing a user to preview channel content while reducing tuning latency, the method comprising the acts of:

tuning a first channel with a first tuner, the first channel being selected by a user from the plurality of channels;

with a second tuner, maintaining an updated preview of one or more of the plurality of channels which are not currently tuned, the updated preview representing current content of the one or more channels;

displaying the updated preview of the one or more channels for user selection so that the user is able to quickly review the current content of the one or more channels simultaneously without having to select and tune each of those channels individually;

based on at least a display arrangement of the updated preview of the one or more channels and any received user input relative to the display arrangement, predicting user selection of a second channel which is not currently tuned; and tuning the second channel for viewing with the second tuner prior to user selection of the second channel so that when the second channel is selected, delay associated with tuning the second channel is reduced because the second tuner already tunes the second channel for viewing.

2. A method as defined in claim 1, further comprising acts of:

receiving user input selecting the second channel;

displaying the second channel; and tuning a next channel using the first tuner while the second channel is displayed to the user.

3. A method as defined in claim 2, wherein the act of tuning the next channel is initiated prior to receiving user input selecting the next channel.

4. A method as defined in claim 2, wherein the next channel is predicted by selecting, from the plurality of channels, a channel that is incrementally related to the second channel.

5. A method as defined in claim 2, wherein the next channel is predicted by selecting, from the plurality of channels, a channel that is decrementally related to the second channel.

6. A method as defined in claim 1, further comprising the act of tuning, by the first and second tuners, alternate channels as the user sequentially cycles through the plurality of channels.

7. A method as defined in claim 2, wherein the programming content is encoded in a digital format, and wherein the acts of tuning a second channel, receiving user input selecting the second channel, and displaying the second channel are conducted such that the second channel is displayed immediately and without latency upon receiving the user input.

8. In a system receiving programming content including a plurality of channels encoded in a digital format, a method of reducing latency when tuning a channel, the method comprising the acts of:

receiving the plurality of channels at the set top box;

tuning a first channel with a first tuner;

periodically tuning, with a second tuner, one or more of the plurality of channels included in the programming;

storing a preview of the one or more channels periodically tuned with the second tuner, the preview representing current content for the one or more channels when the one or more channels are not otherwise tuned;

displaying the preview of the one or more channels so that a user can review the current content of the one or more channels simultaneously, without having to select and tune each of the one or more channels individually;

based on at least a display arrangement of the preview of the one or more channels and any received user input relative to the display arrangement, predicting user selection of a second channel which is not currently tuned; and tuning the second channel for viewing with the second tuner prior to user selection of the second channel so that if the second channel is selected, delay otherwise associated with tuning the second channel is reduced because the second tuner already tunes the second channel for viewing.

9. A method as defined in claim 8, further comprising an act of sequentially tuning, with at least the first and second turners, the plurality of channels included in the programming content, wherein a current channel included in the plurality of channels is tuned by the first tuner and a next channel is tuned by the second tuner in alternating fashion, the next channel being tuned prior to receiving user input instructing the set top box to select the next channel, and wherein channels that cannot be displayed are skipped.

10. A method as defined in claim 9, wherein the channels that cannot be displayed include scrambled channels and channels that the user is not authorized to view.

11. A method as defined in claim 9, wherein the act of sequentially tuning further comprises the act of predicting, by the set top box, the next channel selected by the user, wherein the next channel is selected by user input provided by the user.

12. A method as defined in claim 8, wherein the second channel is predicted according to user input as a selector is moved among the preview of each of the one or more channels.

13. For a set top box receiving programming content, the programming content having a plurality of channels, a computer program product comprising one or more computer readable media carrying computer executable instructions that implement a method of allowing a user to preview channel content while reducing tuning latency, the method comprising the acts of:

tuning a first channel with a first tuner, the first channel being selected by a user from the plurality of channels;

with a second tuner, maintaining an updated preview of one or more of the plurality of channels that either have been recently viewed or are predicted to be viewed in the future, but are not currently tuned, the updated preview representing current content of the one or more channels;

displaying the updated preview of the one or more channels for user selection so that the user is able to quickly review the current content of the one or more channels simultaneously without having to select and tune each of those channels individually;

based on at least a display arrangement of the updated preview of the one or more channels and any received user input relative to the display arrangement, predicting user selection of a second channel which is not currently tuned; and tuning the second channel for viewing with the second tuner prior to user selection of the second channel so that when the second channel is selected, delay associated with tuning the second channel is reduced because the second tuner already tunes the second channel for viewing.

14. A computer program product as defined in claim 13, the method further comprising acts of:

receiving user input selecting the second channel;

displaying the second channel; and tuning a next channel using the first tuner while the second channel is displayed to the user.

15. A computer program product as defined in claim 14, wherein the act of tuning the next channel is initiated prior to receiving user input selecting the next channel.

16. A computer program product as defined in claim 14, wherein the next channel is predicted by selecting, from the plurality of channels, a channel that is incrementally related to the second channel.

17. A computer program product as defined in claim 14, wherein the next channel is predicted by selecting, from the plurality of channels, a channel that is decrementally related to the second channel.

18. A computer program product as defined in claim 13, further comprising the act of tuning, by the first and second tuners, alternate channels as the user sequentially cycles through the plurality of channels.

19. A computer program product as defined in claim 14, wherein the programming content is encoded in a digital format, and wherein the acts of tuning a second channel, receiving user input selecting the second channel, and displaying the second channel are conducted such that the second channel is displayed immediately and without latency upon receiving the user input.

* * * * *